Oct. 8, 1929.  R. E. MARBURY  1,730,858
CONDENSER SYSTEM
Filed Oct. 1, 1923
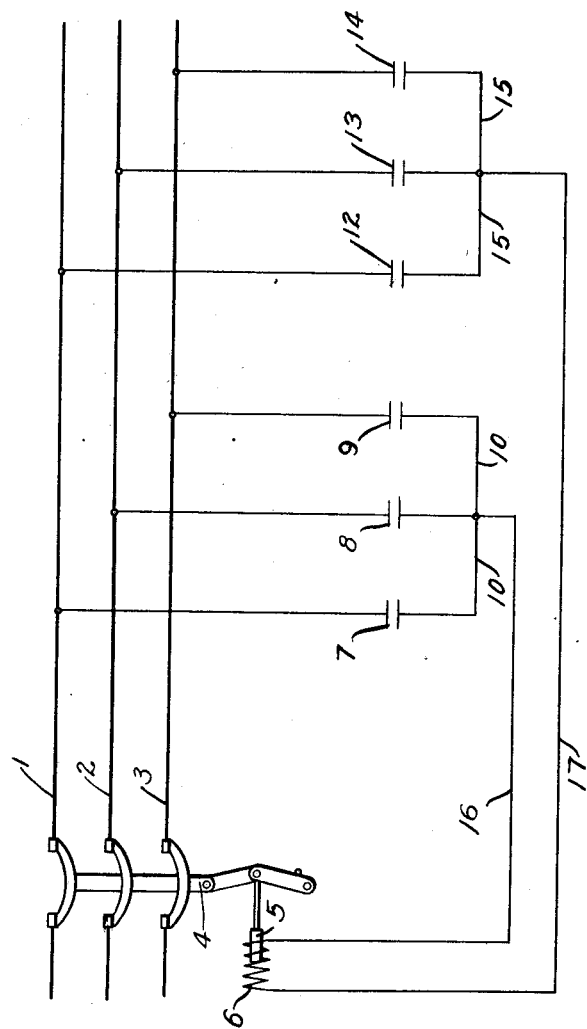
WITNESSES:
INVENTOR
Ralph E. Marbury
BY
ATTORNEY Patented Oct. 8, 1929

1,730,858

UNITED STATES PATENT OFFICE

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA

CONDENSER SYSTEM

Application filed October 1, 1923. Serial No. 665,833.

My invention relates to condenser systems, more particularly to a system of condenser connections for the detection of unbalance in a star-connected condenser system.

Heretofore, condensers have been connected to a high-voltage three-phase line in a Y-bank; that is, with one terminal connected to the respective phases of the power line and having a common connection uniting the opposite terminals of said condensers in a star point, for power factor correction, and for the prevention of unbalance between phases or sets of phases. However, a breakdown on one phase did not always open the circuit as was contemplated, or the removal of a unit from one phase would open the circuit when such was not necessary or a condenser might break down, thus overloading the others without it being discovered for some time.

It is among the objects of my invention to overcome the disadvantages of previous systems and to provide a system of condensers or reactors connected to a power line and having a common connection or connections which embodies actuating means for opening the power line circuit when said circuit is unbalanced.

In the accompanying drawing, constituting a part hereof and in which like reference characters designate like parts, The single figure is a diagrammatic representation of a system connected in accordance with my invention.

In a power line comprising a plurality of conductors or phases 1, 2 and 3 is a switching means or circuit breaker 4, having an armature member 5, which may be operated by the actuating or tripping coil 6. To the phases 1, 2 and 3 of the power line, I connect the condensers 7, 8 and 9, respectively, which condensers are of equal capacities and have one terminal connected to a common conductor 10. To the phases 1, 2 and 3 of the power line, I connect the condensers 12, 13 and 14, respectively, the other terminals of the condensers being connected by a common conductor 15. The tripping coil 6 of the circuit breaker 4, is connected in the circuit between the connectors 10 and 15 by means of leads 16 and 17.

Normally, the voltage drop across the coil 6 or, in other words, between the connectors 10 and 15 is zero. Should one or more of the condensers 7, 8, 9, 12, 13 and 14 break down or become short-circuited, there will be a voltage drop across the coil 6, a current will flow and the breaker 4 will operate to open the circuit, thus preventing overloading and serious injury of the other condensers.

In this system, units may be removed from, or added to, any phase or any group without disturbing the breaker setting. The breaker will not allow the circuit to remain closed unless the phases are balanced. Capacity variation because of variation in line voltage will not cause the breaker to open the circuit. Because of the positive action of this system, the circuit breaker may be set so as to open the circuit when a very small degree of unbalance occurs. A breakdown or short circuit anywhere in the condenser system will cause the breaker to open the circuit.

Although I have shown and described my invention in its preferred form, it is obvious that various changes may be made therein within the spirit and scope of my invention. For instance, I have shown condensers which diagrammatically represent only very small capacities, but which may be large or which may be sets of condensers comprising a number of smaller units in series or in parallel. I desire, therefore, that no limitations shall be imposed on my invention except as set forth in the appended claims.

I claim as my invention:

1. A protective system comprising the combination, with a polyphase line, of a polyphase translating device and connections including a circuit breaker between said line and said translating device, said translating device comprising a plurality of single-phase units connected in two star-connected groups, a circuit connecting the two star points of said groups, and means responsive to a flow of current in said circuit between the two groups for tripping said circuit breaker.

2. A polyphase static condenser system comprising a plurality of single-phase condenser units connected in two star-connected groups, a polyphase transmission line, a circuit breaker connected between said line and said two star-connected groups, a circuit connecting the two start points of said groups, and means responsive to a flow of current in said circuit between the two star points for tripping said circuit breaker.

In testimony whereof, I have hereunto subscribed my name this 26th day of September, 1923.

RALPH E. MARBURY.